United States Patent
Kim et al.

(10) Patent No.: US 10,444,752 B2
(45) Date of Patent: Oct. 15, 2019

(54) STEREO CAMERA-BASED AUTONOMOUS DRIVING METHOD AND APPARATUS

(71) Applicant: SAMSUNG ELECTRONICS CO., LTD., Suwon-si (KR)

(72) Inventors: Changhyun Kim, Seongnam-si (KR); Hyoa Kang, Seoul (KR); Changwoo Shin, Hwaseong-si (KR); Baek Hwan Cho, Seoul (KR); Derek Daehyun Ji, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 15/440,138

(22) Filed: Feb. 23, 2017

(65) Prior Publication Data
US 2018/0052457 A1 Feb. 22, 2018

(30) Foreign Application Priority Data
Aug. 16, 2016 (KR) .......................... 10-2016-0103488

(51) Int. Cl.
*G05D 1/00* (2006.01)
*G05D 1/02* (2006.01)
(Continued)

(52) U.S. Cl.
CPC ........... *G05D 1/0055* (2013.01); *B60W 30/00* (2013.01); *G05D 1/0251* (2013.01); *G06K 9/00791* (2013.01); *G06T 7/593* (2017.01); *G06T 7/596* (2017.01); *H04N 13/128* (2018.05); *H04N 13/239* (2018.05); *H04N 13/243* (2018.05); *H04N 13/296* (2018.05);
(Continued)

(58) Field of Classification Search
None
See application file for complete search history.

(56) References Cited

U.S. PATENT DOCUMENTS 6,487,500 B2 11/2002 Lemelson et al.
6,737,964 B2 * 5/2004 Samman ................... B60R 1/00
340/436
(Continued)

FOREIGN PATENT DOCUMENTS

KR 10-2005-0013000 A 2/2005
KR 10-2005-0080534 A 8/2005
(Continued)

OTHER PUBLICATIONS

Machine translation of WO 2013020872 A1 (Year: 2013).*
(Continued)

*Primary Examiner* — Mohammad J Rahman
(74) *Attorney, Agent, or Firm* — Sughrue Mion, PLLC

(57) ABSTRACT

Disclosed is a stereo camera-based autonomous driving method and apparatus, the method including estimating a driving situation of a vehicle, determining a parameter to control a stereo camera width of a stereo camera based on the estimated driving situation, controlling a capturer configured to control arrangement between two cameras of the stereo camera for a first direction based on the determined parameter, and measuring a depth of an object located in the first direction based on two images respectively captured by the two cameras with the controlled arrangement.

56 Claims, 11 Drawing Sheets

(51) Int. Cl.
    *H04N 13/00*        (2018.01)
    *G06K 9/00*         (2006.01)
    *G06T 7/593*       (2017.01)
    *H04N 13/243*      (2018.01)
    *H04N 13/296*      (2018.01)
    *B60W 30/00*       (2006.01)
    *H04N 13/128*      (2018.01)
    *H04N 13/239*      (2018.01)

(52) U.S. Cl.
    CPC ............... *G05D 2201/0213* (2013.01); *G06T 2207/10021* (2013.01); *G06T 2207/10028* (2013.01); *G06T 2207/10048* (2013.01); *G06T 2207/30252* (2013.01); *H04N 2013/0081* (2013.01)

(56) References Cited

U.S. PATENT DOCUMENTS

| | | | |
|---|---|---|---|
| 7,774,158 B2 | 8/2010 | Domingues Goncalves et al. | |
| 8,340,852 B2 | 12/2012 | Bageshwar et al. | |
| 9,071,829 B2 | 6/2015 | Michot et al. | |
| 9,185,391 B1* | 11/2015 | Prechtl | H04N 13/194 |
| 9,208,389 B2 | 12/2015 | Sung et al. | |
| 9,221,396 B1 | 12/2015 | Zhu et al. | |
| 10,152,890 B2* | 12/2018 | Mutou | G08G 1/16 |
| 2004/0207515 A1* | 10/2004 | Chung | B60Q 9/008 |
| | | | 340/435 |
| 2005/0237385 A1* | 10/2005 | Kosaka | G01B 11/00 |
| | | | 348/42 |
| 2006/0182346 A1* | 8/2006 | Yoda | G06F 3/017 |
| | | | 382/190 |
| 2007/0003162 A1* | 1/2007 | Miyoshi | G06T 15/20 |
| | | | 382/276 |
| 2007/0009137 A1* | 1/2007 | Miyoshi | B60R 1/00 |
| | | | 382/104 |
| 2008/0136612 A1* | 6/2008 | Machii | G01S 11/12 |
| | | | 340/435 |
| 2009/0265107 A1* | 10/2009 | Matsuno | G08G 1/165 |
| | | | 701/301 |
| 2010/0021011 A1* | 1/2010 | Shida | B60R 1/00 |
| | | | 382/104 |
| 2010/0265600 A1* | 10/2010 | Okuda | B60R 1/02 |
| | | | 359/843 |
| 2010/0328437 A1* | 12/2010 | Lee | G01C 11/06 |
| | | | 348/47 |
| 2012/0113232 A1 | 5/2012 | Joblove | |
| 2012/0113278 A1* | 5/2012 | Okada | H04N 5/217 |
| | | | 348/208.4 |
| 2012/0218266 A1* | 8/2012 | Maeta | A63F 13/00 |
| | | | 345/422 |
| 2012/0307017 A1* | 12/2012 | Lievens | H04N 13/243 |
| | | | 348/47 |
| 2012/0327189 A1* | 12/2012 | Muramatsu | G01C 3/06 |
| | | | 348/46 |
| 2013/0235163 A1* | 9/2013 | Joo | H04N 13/239 |
| | | | 348/47 |
| 2014/0063295 A1* | 3/2014 | Tanaka | G03B 15/00 |
| | | | 348/239 |
| 2014/0300706 A1* | 10/2014 | Song | H04N 13/246 |
| | | | 348/49 |
| 2015/0003087 A1* | 1/2015 | Futamura | B60Q 1/143 |
| | | | 362/466 |
| 2015/0036886 A1* | 2/2015 | Matono | G08G 1/166 |
| | | | 382/106 |
| 2015/0358611 A1* | 12/2015 | Cui | G06T 7/593 |
| | | | 348/49 |
| 2016/0205384 A1 | 7/2016 | Sekiguchi et al. | |
| 2016/0339959 A1* | 11/2016 | Lee | B62D 15/0265 |
| 2017/0028917 A1* | 2/2017 | Tauchi | G08G 1/165 |
| 2017/0180701 A1* | 6/2017 | Matono | B60R 1/00 |
| 2017/0251193 A1* | 8/2017 | Zhou | G01C 11/06 |
| 2017/0293199 A1* | 10/2017 | Kim | H04N 5/2252 |
| 2018/0031848 A1* | 2/2018 | Huang | G02B 27/017 |
| 2018/0137339 A1* | 5/2018 | Osato | B60R 21/00 |
| 2018/0300562 A1* | 10/2018 | Yamada | G06T 1/00 |

FOREIGN PATENT DOCUMENTS

| | | |
|---|---|---|
| KR | 10-2012-0065067 A | 6/2012 |
| KR | 10-2014-0049361 A | 4/2014 |
| KR | 10-1454824 B1 | 11/2014 |
| KR | 10-2015-0066303 A | 6/2015 |
| KR | 10-2015-0138889 A | 12/2015 |
| WO | WO 2016/086379 A1 | 6/2016 |

OTHER PUBLICATIONS

Choi, Yukung et al. "All-Day Visual Place Recognition: Benchmark Dataset and Baseline." IEEE Conference on Computer Vision and Pattern Recognition Workshops (CVPRW—VPRICE), Jun. 2015 (9 pages in English).

Schöps, Thomas, et al. "Semi-Dense Visual Odometry for AR on a Smartphone." Mixed and Augmented Reality (ISMAR), 2014 IEEE International Symposium on. IEEE, 2014. (6 pages, in English).

European Search Report dated Sep. 22, 2017 in corresponding European Patent Application No. 17161881.2 (8 pages in English).

Communication dated Jul. 16, 2019 by the European Patent Office in counterpart European Patent Application No. 17161881.2.

* cited by examiner

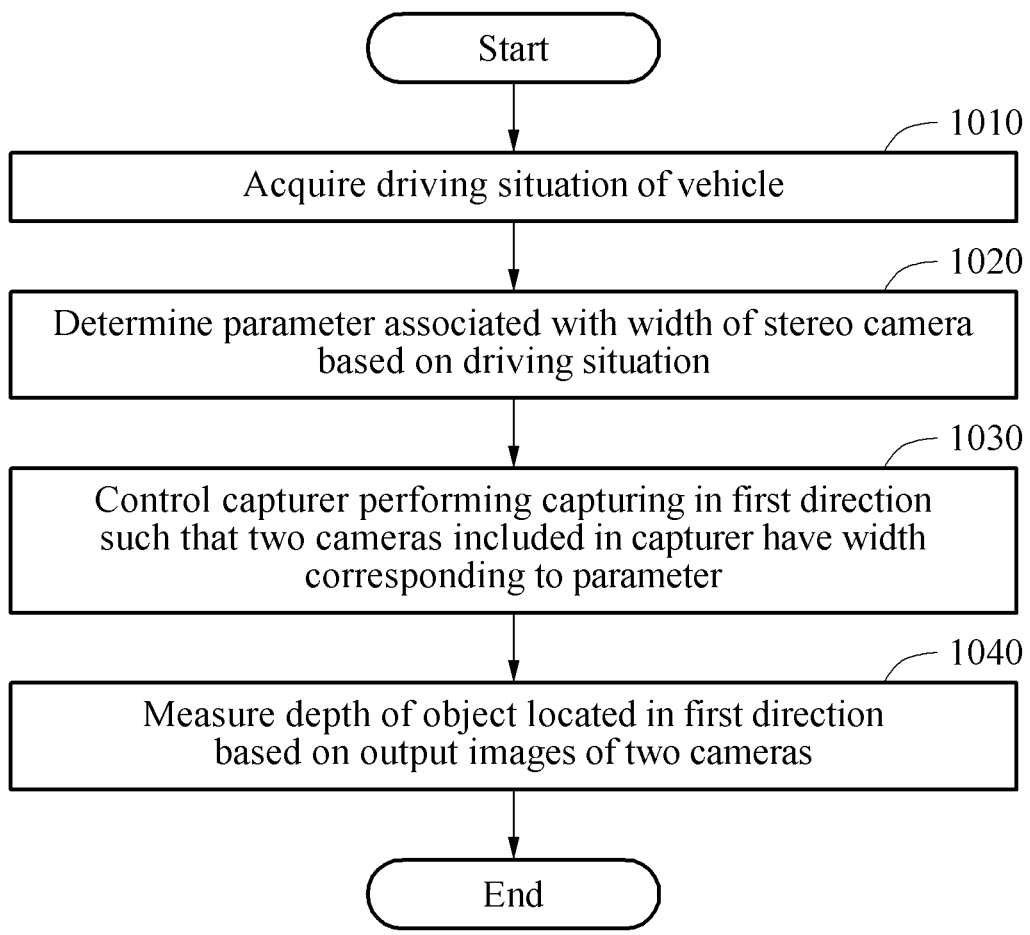

STEREO CAMERA-BASED AUTONOMOUS DRIVING METHOD AND APPARATUS

CROSS-REFERENCE TO RELATED APPLICATION(S)

This application claims the benefit under 35 USC § 119(a) of Korean Patent Application No. 10-2016-0103488 filed on Aug. 16, 2016, in the Korean Intellectual Property Office, the entire disclosure of which is incorporated herein by reference for all purposes.

BACKGROUND

1. Field

The following description relates to a stereo camera-based autonomous driving method and apparatus.

2. Description of Related Art

Autonomous driving may include driving performed by a vehicle without manipulation of the vehicle by a user, e.g., the driver of the vehicle, and/or providing alternate conveniences to the user while driving. Recognition of the three-dimensional (3D) environment surrounding a vehicle may be desired for the autonomous driving. For example, a stereo camera, an infrared light camera, a proximity sensor, an ultrasonic sensor, radar, and/or lidar may be used for the recognition of the surrounding 3D environment of the vehicle.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, an autonomous driving method includes estimating a driving situation of a vehicle, determining a parameter to control a stereo camera width of a stereo camera based on the estimated driving situation, controlling a capturer configured to control arrangement between two cameras of the stereo camera for a first direction based on the determined parameter, and measuring a depth of an object located in the first direction based on two images respectively captured by the two cameras with the controlled arrangement.

The controlling of the capturer may include selecting the two cameras, from among a plurality of cameras facing the first direction in a camera array of the capturer, that are separated apart from each other by a distance corresponding to the determined parameter.

The plurality of cameras may be fixedly arranged in the capturer and each linearly separated by a first distance, and the distance corresponding to the determined parameter may be evenly divisible by the first distance.

The two cameras may be configured in the capturer to be selectively moved by the capturer, and the controlling of the capturer may include selectively moving at least one of the two cameras such that the two cameras are separated apart from each other by a distance corresponding to the determined parameter.

The two cameras may be configured in the capturer to be selectively moved by the capturer along a predetermined route, and the controlling of the capturer may include selectively moving the at least one of the two cameras along the predetermined route such that the two cameras are separated apart from each other by the distance corresponding to the determined parameter.

The determining of the parameter may include determining a stopping distance of the vehicle based on the estimated driving situation, and determining the parameter based on a predetermined constraint associated with the stopping distance.

The predetermined constraint associated with the stopping distance may be based on consideration of a maximum measurable depth corresponding to the stereo camera width and a relationship between the stopping distance and a safe distance based on a depth error of the maximum measurable depth.

The determining of the parameter may include determining a threshold for a blind spot area based on the estimated driving situation, and determining the parameter based on a predetermined constraint associated with the threshold for the blind spot area.

The determining of the threshold for the blind spot area may include determining a threshold blind spot distance based on the estimated driving situation, and the predetermined constraint may be associated with the threshold blind spot distance.

The predetermined constraint associated with the threshold blind spot distance may be based on consideration of a relationship between the threshold blind spot distance and a blind spot distance corresponding to the stereo camera width.

The determining of the parameter may include determining a stopping distance and a threshold for a blind spot area based on the estimated driving situation, determining a minimum value for the parameter based on a predetermined constraint associated with the stopping distance, determining a maximum value for the parameter based on a predetermined constraint associated with the threshold for the blind spot area, and determining the parameter to be a value equal to either or between the minimum value and the maximum value.

The determining of the threshold may include determining a threshold blind spot distance, and the predetermined constraint may be associated with the threshold blind spot distance.

When the estimated driving situation is the vehicle driving at high speed, the determining of the parameter may include determining the parameter such that a depth error of a maximum measurable depth corresponding to the stereo camera width is reduced over a depth error of another maximum measurable depth corresponding another stereo camera width determined for a different estimated driving situation corresponding to the vehicle driving at a lower speed.

When the estimated driving situation is the vehicle driving at low speed, the determining of the parameter may include determining the parameter such that a blind spot distance corresponding to the stereo camera width is reduced over a blind spot distance corresponding another stereo camera width determined for a different estimated driving situation corresponding to the vehicle driving at a higher speed.

The estimated driving situation may be determined based on at least one of a determination of a speed of the vehicle, a moving direction of the vehicle, a location of the vehicle, or a user manipulation.

The estimated driving situation may include at least one of the vehicle driving straight ahead, changing lanes, changing direction, driving on a highway, driving at high speed, driving at low speed, driving in a city, driving with a weather affecting condition, or driving with a road affecting condition, and the determining of the parameter may include determining the parameter based on the estimated driving situation and corresponding prioritized consideration between an extent of depth error of a maximum measurable depth corresponding to the stereo camera width and an extent of a blind spot area corresponding to the stereo camera width.

The method may further include predicting a driving direction of the vehicle based on the estimated driving situation, and the determining of the parameter may include determining the parameter based on a visual field direction of the stereo camera corresponding to the predicted driving direction.

The method may further include selectively turning off one or more additional stereo cameras of the vehicle respectively for one or more other visual field directions that are determined not needed for driving of the vehicle in the predicted driving direction.

The method may further include controlling the capturer or another capturer so that two additional cameras perform stereo capturing in a second direction, opposite to the first direction, with a stereo camera width based on the determined parameter, and measuring a depth of an object located in the second direction based on output images of the two additional cameras, where the capturer or the other capturer may be configured to perform capturing in the second direction in coordination with the captured two images in the first direction.

In one general aspect, a non-transitory computer-readable storage medium stores instructions that, when executed by a processor, cause the processor to perform one or more, any combination of, or all operations described herein.

In one general aspect, an autonomous driving apparatus includes a capturer including at least two cameras, the capturer being configured to control arrangement between the two cameras, and a controller configured to determine a parameter related to a stereo camera width, of a stereo camera represented by the two cameras, based on an estimated driving situation of a vehicle, configured to control the capturer to control the arrangement between the two cameras based on the determined parameter, and configured to measure a depth of an object located in a first direction based on two images respectively captured by the two cameras with the controlled arrangement.

The controller may be further configured to determine the estimated driving situation based on sensed information or one or more driving situation estimations from sensors of the vehicle and/or from sensors or devices external of the vehicle.

The capturer may include a camera array including a plurality of cameras facing in the first direction, and the controller may be configured to select, from among the plurality of cameras, the two cameras that are separated apart from each other by a distance corresponding to the determined parameter.

The plurality of cameras may be fixedly arranged in the capturer and each linearly separated by a first distance, and the distance corresponding to the determined parameter may be evenly divisible by the first distance.

The two cameras may be configured in the capturer to be selectively moved by the capturer, and the controller may be configured to control the capturer to move one or more of the two cameras such that the two cameras are separated from each other by a distance corresponding to the determined parameter.

The two cameras may be configured in the capturer to be selectively moved by the capturer along a predetermined route, and the controller may be configured to control the capturer to move the one or more of the two cameras along the predetermined route such that the two cameras are separated from each other by the distance corresponding to the determined parameter.

The controller may be configured to determine a stopping distance of the vehicle based on the estimated driving situation and determine the parameter based on a predetermined constraint associated with the stopping distance.

The predetermined constraint associated with the stopping distance may be based on consideration of a maximum measurable depth corresponding to the stereo camera width and a relationship between the stopping distance and a safe distance based on a depth error of the maximum measurable depth.

The controller may be configured to determine a threshold for a blind spot area based on the estimated driving situation and determine the parameter based on a predetermined constraint associated with the threshold for the blind spot area.

The determining of the threshold for the blind spot area may include determining a threshold blind spot distance based on the estimated driving situation, and the predetermined constraint may be associated with the threshold blind spot distance.

The predetermined constraint associated with the threshold blind spot distance may be based on consideration of a relationship between the threshold blind spot distance and a blind spot distance corresponding to the stereo camera width.

The controller may be configured to determine a stopping distance and a threshold for a blind spot area based on the estimated driving situation, determine a minimum value for the parameter based on a predetermined constraint associated with the stopping distance, determine a maximum value for the parameter based on a predetermined constraint associated with the threshold for the blind spot area, and determine the parameter to be a value equal to either or between the minimum value and the maximum value.

The determining of the threshold may include determining a threshold blind spot distance, and the predetermined constraint may be associated with the threshold blind spot distance.

When the estimated driving situation is the vehicle driving at high speed, the controller may be configured to determine the parameter such that a depth error of a maximum measurable depth corresponding to the stereo camera width is reduced over a depth error of another maximum measurable depth corresponding to another stereo camera width determined for a different estimated driving situation corresponding to the vehicle driving at a lower speed.

When the estimated driving situation is the vehicle driving at low speed, the controller may be configured to determine the parameter such that a blind spot distance corresponding to the stereo camera width is reduced over a blind spot distance corresponding to another stereo camera width determined for a different estimated driving situation corresponding to the vehicle driving at a higher speed.

The apparatus may further include a sensor configured to sense at least one of a speed of the vehicle, a moving direction of the vehicle, a location of the vehicle, or a user manipulation, where the estimated driving situation may be determined based on at least one of the sensed speed of the vehicle, moving direction of the vehicle, location of the vehicle, or user manipulation.

The estimated driving situation may include at least one of the vehicle driving straight ahead, changing lanes, changing direction, driving on a highway, driving at high speed, driving at low speed, driving in a city, driving with a weather affecting condition, or driving with a road affecting condition, and the controller may be configured to determine the parameter based on the estimated driving situation in prioritized consideration between an extent of depth error of a maximum measurable depth corresponding to the stereo camera width and an extent of a blind spot area corresponding to the stereo camera width.

The controller may be configured to predict a driving direction of the vehicle based on the estimated driving situation and determine the parameter based on a visual field direction of the stereo camera corresponding to the predicted driving direction.

The controller may be configured to selectively turn off one or more additional stereo cameras of the vehicle respectively for one or more other visual field directions that are determined not needed for driving of the vehicle in the predicted driving direction.

The capturer or another capturer may be configured to include two additional cameras to perform stereo capturing in a second direction, opposite the first direction, with a stereo camera width based on the determined parameter, and the controller may be configured to control the capturer or the other capturer in coordination with the captured two images in the first direction so that the two additional cameras perform the capturing in the second direction with the stereo camera width based on the determined parameter, and may be configured to measure a depth of an object located in the second direction based on output images of the two additional cameras.

In one general aspect, an autonomous driving apparatus includes a processor configured to determine a parameter to control a stereo camera width of a stereo camera based on the estimated driving situation of a vehicle, control a capturer configured to control arrangement between two cameras of the stereo camera for a first direction based on the determined parameter, and measure a depth of an object located in the first direction based on two images respectively captured by the two cameras with the controlled arrangement.

The apparatus may further include a memory configured to store instructions, where the processor may be further configured to execute the instructions to configure the processor to perform the determining of the parameter to control the stereo camera width of the stereo camera based on the estimated driving situation, the controlling of the capturer to control the arrangement between the two cameras of the stereo camera for the first direction based on the determined parameter, and the measuring of the depth of the object located in the first direction based on the two images respectively captured by the two cameras with the controlled arrangement.

The processor may be further configured to determine the estimated driving situation based on sensed information or one or more driving situation estimations from sensors of the vehicle and/or from sensors or devices external of the vehicle.

The apparatus may further include the capturer, which includes the two cameras, and/or the sensors of the vehicle.

The apparatus may include the capturer and the capturer may include a camera array including a plurality of cameras facing in the first direction, and the processor may be further configured to select, from among the plurality of cameras, the two cameras that are separated apart from each other by a distance corresponding to the determined parameter.

The plurality of cameras may be fixedly arranged in the capturer and each linearly separated by a first distance, and the distance corresponding to the determined parameter may be evenly divisible by the first distance.

The apparatus may include the capturer and the two cameras are configured in the capturer to be selectively moved by the capturer, and the processor may be further configured to control the capturer to move one or more of the two cameras such that the two cameras are separated from each other by a distance corresponding to the determined parameter.

The two cameras may be configured in the capturer to be selectively moved by the capturer along a predetermined route, and the processor may be configured to control the capturer to move the one or more of the two cameras along the predetermined route such that the two cameras are separated from each other by the distance corresponding to the determined parameter.

The processor may be further configured to control the capturer to rotate at least one of the two cameras in a prioritized direction based on the estimated driving situation.

The apparatus may include the capturer and the two cameras may be configured in the capturer to be selectively moved by the capturer, and the processor may be configured to control the capturer to rotate at least one of the two cameras in a prioritized direction corresponding to a direction indicated by a user manipulation of a turn signal level of the vehicle or based on which of left or right turn signal indicators are activated in the vehicle.

The processor may be further configured to determine a stopping distance and a threshold for a blind spot area based on the estimated driving situation, determine a minimum value for the parameter based on a predetermined constraint associated with the stopping distance, determine a maximum value for the parameter based on a predetermined constraint associated with the threshold for the blind spot area, and determine the parameter to be a value equal to either or between the minimum value and the maximum value.

The determining of the threshold may include determining a threshold blind spot distance, and the predetermined constraint may be associated with the threshold blind spot distance.

When the estimated driving situation is the vehicle driving at high speed, the processor may be configured to determine the parameter such that a depth error of a maximum measurable depth corresponding to the stereo camera width is reduced over a depth error of another maximum measurable depth corresponding to another stereo camera width determined for a different estimated driving situation corresponding to the vehicle driving at a lower speed.

When the estimated driving situation is the vehicle driving at low speed, the processor may be configured to determine the parameter such that a blind spot distance corresponding to the stereo camera width is reduced over a blind spot distance corresponding to another stereo camera width determined for a different estimated driving situation corresponding to the vehicle driving at a higher speed.

The processor may be further configured to determine surrounding environment information of the vehicle based on the measured depth and to control the determined surrounding environment information to be displayed on a display of the vehicle.

The vehicle may also be an automobile, or another type of vehicle.

Other features and aspects will be apparent from the following detailed description, the drawings, and the claims.

BRIEF DESCRIPTION OF THE DRAWINGS

FIG. 10 illustrates an example of an autonomous driving method.

Figure 1:
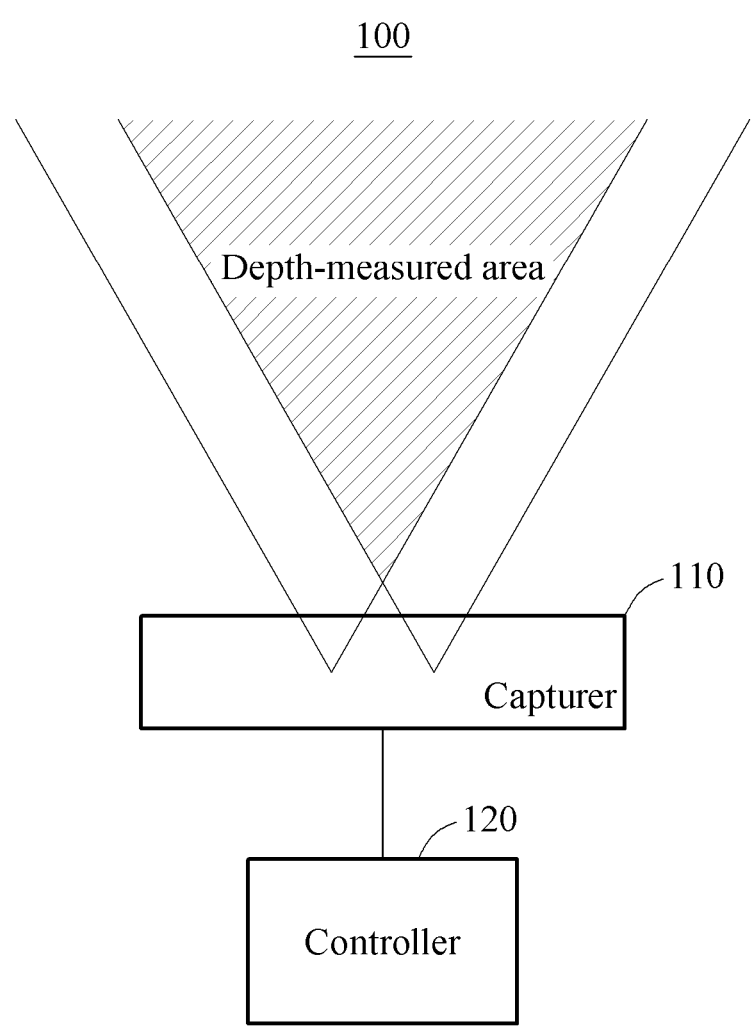
FIG. 1 illustrates an example of an autonomous driving apparatus.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to a second component, and similarly the second component may also be referred to as the first component.

The terminology used herein is for the purpose of describing various examples only, and is not to be used to limit the disclosure. As used herein, the terms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains and that is consistent, and not in conflict, with an understanding of the present disclosure and the use of such terms in the present disclosure. Terms, such as those defined in commonly used dictionaries, are to be interpreted as having a meaning that is consistent with their meaning in the context of the relevant art and consistent with an understanding of the present disclosure, and are not to be interpreted in an idealized or overly formal sense unless expressly so defined herein.

FIG. 1 illustrates an example of an autonomous driving apparatus. Referring to FIG. 1, an autonomous driving apparatus 100 includes a capturer 110 and a controller 120, as only examples. The capturer 110 performs capturing in a first direction, for example, using two or more cameras that output captured images of the first direction. The first direction includes one of a front direction, a rear direction, and any side direction, for example. In the first direction, a depth measurement area is formed where the fields of view of two example cameras overlap each other. The depth measurement area may represent a field of view of a stereo camera corresponding to the two examples cameras. The controller 120 measures a depth of an object located in the depth measurement area of the first direction based on output images of the two cameras. For example, the controller 120 performs stereo matching on the output images of the two cameras to measure the depth of the object. Also, the controller 120 may recognize or determine a three-dimensional (3D) location of the object that includes information of the depth. For example, respective disparities can be measured for determined corresponding/matched objects or points respectively in the output images of the two cameras, to discern the depth of the object. In an example, e.g., where disparity is measured in pixel units, the disparity may represent the pixel distance (e.g., number of pixels) between the image position of a point or object in a first image plane and the image position of the matched/corresponding point or object in the second image plane, for example. In an example, a disparity map or depth map may be generated by the controller 120 based on the measured disparities, such as for determining the depth of determined objects or points. In addition, the matching or correspondence between such points or objects between the two images can be determined according to different approaches, with a simple approach including a block matching algorithm applied between the two images. Though examples have been discussed for measuring the depth of an object using multiple images, e.g., two captured images, differing approaches and methodologies are available for determining the position and/or depth of objects from multiple images, and thus embodiments are not limited to only to such examples described herein.

The capturer 110 may be provided through a structure in which a distance between the two cameras is adjustable and/or different cameras are selectable for representing the stereo camera, so the two cameras are capable of being used for stereo vision. The controller 120 appropriately adjusts the distance between the two cameras and/or selects the cameras so as to have a corresponding distance therebetween, based on a determined or estimated driving situation of a vehicle. The distance between the two cameras is a distance by which the two cameras representing the stereo camera are spaced apart from each other in order to form a binocular disparity and also referred to herein as, for example, a width of the stereo camera.

As further discussed below, the width of the stereo camera affects a width, depth, or extent of a blind spot area outside of the depth measurement area and a maximum measurable depth of the stereo camera within the depth measurement area. Using FIG. 1 as an example, the maximum measurable depth value represents a depth that can be maximally measured in the illustrated vertical direction matching the driving direction of the vehicle, for example, while the corresponding blind spot area represents an area in which a depth measurement in a horizontal direction, i.e., perpendicular to the driving direction, is unavailable or unobservable at least from the stereo camera.

While the maximum measurable depth increases as the width of the stereo camera is increased, the blind spot area also increases with the increase in the width of the stereo camera. Conversely, a decrease in the width of the stereo camera results in a decrease in the maximum measurable depth and a decrease in the blind spot area. As such, the maximum measurable depth and the blind spot area are in a trade-off relationship and thus, the width of the stereo camera may be adjusted based on this trade-off relationship and the driving situation. For example, when driving at high speed, recognition of a far object at a long distance from the vehicle may be desirable to obtain a safe distance with other traffic. Thus, the controller 120 may increase the width of the stereo camera to reach a predetermined level. Here, though this increasing of the width of the stereo camera may also increase the blind spot area, it may be determined that there is a greater value or priority in the greater depth measuring capability. Alternatively, when driving at low speed, it may be more desirable to give greater value or priority to a wider visual field than the greater depth measuring capability in preparation for changing lanes, a change in direction, or a possible obtrusion of another vehicle, so the controller 120 may decrease the width of the stereo camera to reach a different predetermined level.

The controller 120 may estimate the driving situation of a vehicle and, based on that estimation, determine a parameter associated with the width of the stereo camera. The controller 120 may estimate the driving situation based on information associated with the driving situation. The controller 120 may also receive an estimation result of the driving situation from another device. For example, the controller 120 receives the information associated with the driving situation from at least one of one or more sensors included in the vehicle and/or one or more sensors or devices external to the vehicle, and estimates the driving situation based on the received information. Also, the controller 120 may receive the estimated driving situation as estimated by at least one of the sensors included in the vehicle or the external sensors or devices. The controller 120 may further receive a mixture of such estimated driving situation results from one or more of the sensors included in the vehicle and the external sensors and/or devices and make a final estimation of the current driving situation based on the received estimated driving situations and the collected/received information associated with the driving situation.

The different driving situations may include at least one of driving at high speed, driving at low speed, driving on a highway, driving in a city, driving straight ahead, changing lanes, changing direction, an obtruding vehicle or obstacle, a weather condition, or a road condition, as only non-limiting examples. Whether the vehicle is driving at a high speed and or at a low speed may be determined based on a predetermined reference value. For example, when a speed of the vehicle is greater than or equal to the reference value, the driving situation may be determined to be that the vehicle is driving at high speed. Conversely, when the speed of the vehicle is less than the reference value, the driving situation may be determined to be that the vehicle is driving at low speed. There may also be multiple such reference values so as to have multiple driving speed situations from the vehicle driving very fast to the vehicle driving very slow, for example. Whether the vehicle is driving on a highway and/or whether the vehicle is the driving in a city may be determined based on a determined location of the vehicle, such as determined through a global positioning system (GPS) of the vehicle or alternate device and/or object/location recognition from the camera(s) captured images. There may also be other location based driving situations. Whether the vehicle is driving straight ahead, changing lanes, or changing direction, as only examples, may be determined based on a determined or measured moving direction of the vehicle and/or a user action or manipulation with respect to the vehicle. For example, the changing of lanes driving situation or the changing of direction driving situation may be determined in response to a change in the moving direction of the vehicle, a steering manipulation of a user, or a direction indicating manipulation of the user. The controller 120 may also acquire weather information of a current location of the vehicle from, for example, a connectable or connected to weather center database or server, e.g., based on determined GPS information. Also, the controller 120 may predict the road condition based on a result obtained by analyzing an image capturing a current driving road and/or the weather information. The driving condition may also be indicated orally by the user speaking into a microphone of the controller 120.

As only examples, the sensor(s) and/or the external device(s) may sense and record at least one of the speed of the vehicle, the moving direction of the vehicle, the location of the vehicle, and the user manipulation using one or more general schemes. The user manipulation may include, for example, the steering manipulation, the direction indicating manipulation, an accelerating manipulation, a decelerating manipulation, and a parking manipulation of the vehicle. The user manipulation may be input through a steering device, a direction indicating device such as a turn signal lever or indicator, an accelerating pedal, a braking pedal, and a parking brake of the vehicle, as only examples. The controller 120 receives information sensed by at least one of the corresponding sensors and/or the external devices and may estimate the driving situation based on the sensed information. Also, the sensors and the external devices may estimate the driving situation based on the sensed information and inform the controller 120 of their respectively estimated driving situation. In addition, in one or more embodiments, based on information from such differing sensors or determined conditions and based on previous training data, the controller 120 may also estimate the driving situation by providing such information to a driving situation model or other deep learning, machine learning, or hierarchical analytics that may be trained or designed based on such training data and, depending on embodiment, updated through confirming or negating interaction with the user regarding the results of the estimated driving situations and through other updating mechanisms, such as by connectable or connected manufacture databases or servers.

The controller 120 determines or sets the parameter associated with the width of the stereo camera based on the estimated driving situation. For example, the parameter may have a value corresponding to or indicating a desired width of the stereo camera. As further discussed below, the controller 120 may determine a minimum value and a maximum value of such a parameter based on the estimated driving situation and determine or set the parameter to be a value between the maximum value and the minimum value, so the stereo camera has a width determined appropriate for the estimated driving situation. The controller 120 controls the capturer 110 such that the two cameras included in the capturer 110 have a distance therebetween that corresponds to the parameter. Thus, the controller 120 controls the two cameras to capture respective images having the controlled arrangement therebetween according to the parameter. Accordingly, the capturer 110 provides captured image information suitable for the estimated driving situation using the stereo camera, represented by the two cameras, having the width corresponding to the parameter. With such an arrangement, the autonomous driving apparatus 100 acquires and generates autonomous driving or controlling information that is suitable for the driving situation using the cameras of the capturer 110 at a relatively small cost, compared to typical systems that require the use of higher cost lidar or radar systems, for example, to obtain surrounding information.

The controller 120 may control another parameter of the stereo camera based on the driving situation as well as the parameter associated with the width of the stereo camera. For example, the other parameter may be a parameter associated with a visual field direction of the stereo camera. In this example, the controller 120 may predict a driving direction of the vehicle using information from the steering device or the direction indicating device and adjust a parameter for controlling a rotational angle and/or a horizontal visual field width of the stereo camera based on the predicted driving direction of the vehicle. As further discussed below, in an example, the controller 120 may control the horizontal visual field width using a camera array of the capturer 110. Also, in an example, the controller 120 may control the rotational angle using movable and/or rotatable cameras of the capturer 110.

Using the captured images from the stereo cameras with the respectively set stereo camera widths, the controller 120 may control the determination of the depth of objects observed in the captured images. For example, the controller 120 may generate a depth map of the 3D surroundings of the vehicle. From the determined depths, the controller 120 may determine whether observed objects are potential obstructions or are nearing the vehicle, such as another vehicle nearing the vehicle from another lane, which may be determined by the controller 120 by comparing captured images of the stereo camera(s) over time. The controller may further perform respective object classification and/or recognition, as well as global and/or local localization and mapping of the vehicle and the detected object(s). Based on the such object detection, classification, and/or recognition and the global or local localization and mapping, the controller 120 may perform safe path planning for the vehicle, which can be displayed to the driver of the vehicle, such as through display of the vehicle, or used in autonomously driving of the vehicle without user control, depending on embodiment.

Figure 2:
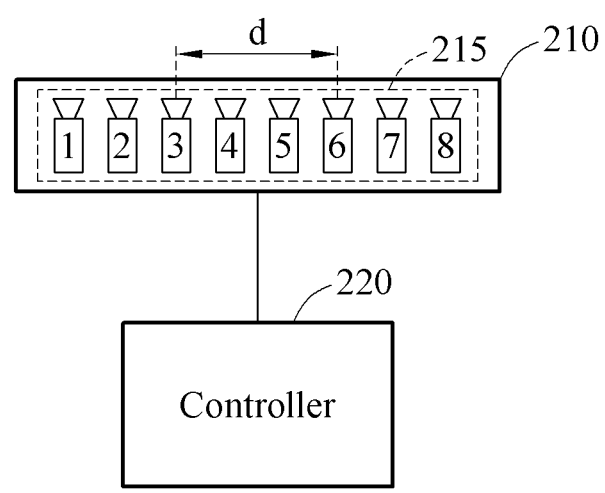
FIG. 2 illustrates an example of a camera array.

FIG. 2 illustrates an example of a camera array. Referring to FIG. 2, a capturer 210 includes a camera array 215, and may correspond to the capturer 110 of FIG. 1, though embodiments are not limited thereto. The camera array 215 includes a plurality of cameras. The plurality of cameras may be arranged at preset intervals, for example, and attached to a frame. When the plurality of cameras are attached to the frame, the example preset intervals separating the plurality of cameras are maintained as an initially set value. As an alternative, the plurality of cameras may be arranged according one or more different preset intervals. A controller 220 determines or sets a parameter associated with a width of a stereo camera based on an estimated driving situation, and selects two cameras from the camera array 215 having a distance therebetween corresponding to the determined or set parameter. For example, when the stereo camera width corresponding to the parameter is a width d, the controller 220 may select any of cameras 1 and 4, cameras 2 and 5, cameras 3 and 6, cameras 4 and 7, or cameras 5 and 8 of FIG. 2, respectively separated by widths d.

When there are numerous cameras at preset intervals, the controller 220 may select two cameras from among the cameras for the stereo camera based on a predetermined reference. In one example, such as when the driving situation is estimated to be that the vehicle is driving directly forward, the controller 220 may be select cameras based on their respective distances from a centerline of the camera array 215. For example, when the stereo camera width corresponding to the determined or set parameter is d, the controller 220 may select cameras 3 and 6 which are separated by the stereo camera width d and are equal distant from the centerline of the camera array 215. In another example, the controller 220 may select cameras based on their relative closeness to a side to which a determined priority has been assigned, e.g., select the camera that is closest to the prioritized side as one of the two cameras of the stereo camera, based on the estimated driving situation. For example, when another vehicle obtrudes or an obstacle is detected from the illustrated right side or there is a determined greater potential for such obtrusion or obstacle based on the estimated driving situation, the controller 220 may assign the priority to the illustrated right direction. In this example, for the same stereo camera width d, the controller 220 may select cameras 5 and 8 closer to the right side as the two cameras representing the stereo camera. Also, the controller 220 may predict the driving direction of the vehicle, and may select cameras based on their relative closeness to the predicted driving direction, e.g., select the camera that is closest to the predicted driving direction as one of the two cameras of the stereo camera, and thus may adjust the horizontal visual field width of the stereo camera. The controller 220 may operate the remaining cameras other than the selected cameras in a standby or power off mode, or they may be used for duplicative or other purposes.

In this regard, in one or more embodiments, the controller 220 may selectively operate other cameras or other stereo cameras, either of the capturer 210 or another capturer, in respective standby or power off modes when the controller 220 determines that image capturing in the corresponding respective field of view directions are not necessary for driving according to the predicted driving direction, such as to save power and resources of the autonomous driving apparatus. For example, if the predicted driving direction is determined to represent a left turn in a right side driving intersection, the controller 220 may control cameras facing toward the left, forward, and right sides of the vehicle to be capturing images for object detection and turn off cameras facing rearward, and potentially one or more of the left and right side cameras may be selectively controlled, such as discussed below with respect to FIG. 3, to move to provide more of forward-left and forward-right fields of view compared to fields of view that include rearward-left or rearward-right directions. If the predicted driving direction is determined to represent a right turn in such an intersection, then a different selection and arrangement of cameras may be chosen, such as to provide left, forward-left, forward, forward-right, right, and rearward-right fields of view. If the predicted driving direction is determined to represent a changing of lanes to the right, for example, then forward, forward-right, right, and rearward-right fields of view may be provided and remaining cameras maintained or turned off. Alternatively, if the predicted driving direction was determined to represent the changing of lanes to the left, then forward, forward-left, left, and rearward-left fields of view may be provided and remaining cameras maintained or turned off. As another example, if an obtruding vehicle is detected, such as a vehicle obtruding laterally from a right lane into a current lane directly into the front field of view, then forward-left, forward, forward-right, right, and rearward-right fields of view may be chosen and corresponding cameras controlled to capture images, while cameras arranged for other fields of view may be selectively maintained or turned off. Any of such cameras may be stereo cameras so the controller(s) 220 may determine the corresponding parameter for the respective stereo camera widths based on the estimated driving situation. In addition, though several examples have been given of select cameras of the autonomous driving vehicle being controlled or selectively controlled in power off modes, for different driving situations, embodiments should not be limited thereto as additional and alternative examples are also available.

Figure 3:
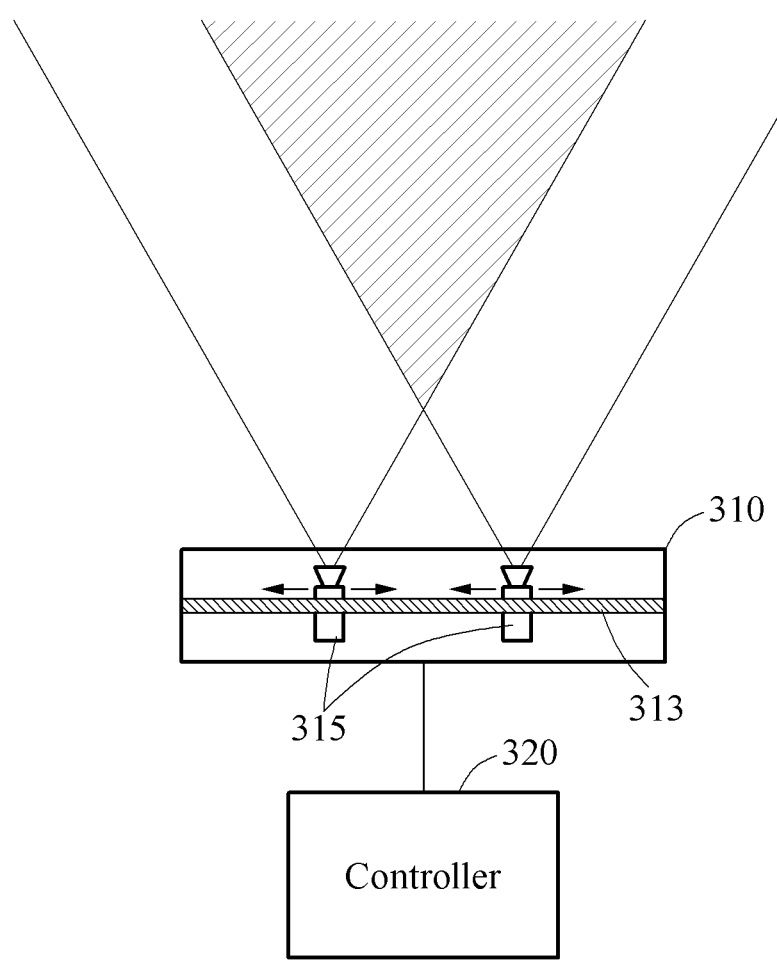
FIG. 3 illustrates an example of movable cameras.

FIG. 3 illustrates an example of movable cameras. Referring to FIG. 3, a capturer 310 includes at least two cameras 315, and may correspond to the capturer 110 of FIG. 1, though embodiments are not limited thereto. As only examples, the two cameras 315 may move along a predetermined route 313, or move along respective predetermined routes. The predetermined route 313 may be implemented as a rail, a chain, or a belt, noting that embodiments are not limited thereto. The capturer 310 may include, for example, a step motor configured to move the two cameras 315 along the predetermined route 313, noting that alternative mechanisms for respectively moving one or more of the cameras are also available. In an example, the two cameras 315 are controlled to move on the predetermined route 313 independently of each other to adjust a distance therebetween, or alternatively only one of the cameras may be controlled to move to increase or decrease the stereo camera width represented by the two cameras. For example, the controller 320 determines a parameter associated with the stereo camera width for an estimated driving situation and causes the two cameras 315 to move, if necessary, such that the two cameras 315 have a distance therebetween corresponding to the parameter.

The controller 320 controls the distance between the two cameras 315 based on the stereo camera width and arranges the two cameras 315 in respective appropriate locations. In one example, the controller 320 adjusts the location(s) of the two cameras 315 such that a centerline between the two cameras 315 corresponds to a centerline of the capturer 310 in a state in which the two cameras 315 provide the stereo camera width corresponding to the parameter. In another example, the controller 320 adjusts the location(s) of the two cameras 315 such that the centerline of the two cameras 315, arranged according to the stereo camera width, is positioned more in a direction to which a priority has been assigned. For example, when another vehicle has been determined to advance or obtrude from the left side or an obstacle is detected as nearing the left side, or when a left direction is predicted as a driving direction of the vehicle, the controller 320 may assign a priority to the left side. In this example, the controller 320 adjusts the locations of the two cameras 315 such that a centerline of the two cameras 315, arranged according to the stereo camera width, is positioned leftward relative to the centerline of the capturer 310. Alternatively, the controller 320 may rotate, such as through one or more corresponding servos represented by the capturer 310, one or both of the two cameras 315 leftward to prioritize the left side. The controller 320 may alternatively respectively perform both the location and rotational angle control of one or both of the two cameras 315 based on the estimated driving situation.

Figure 4:
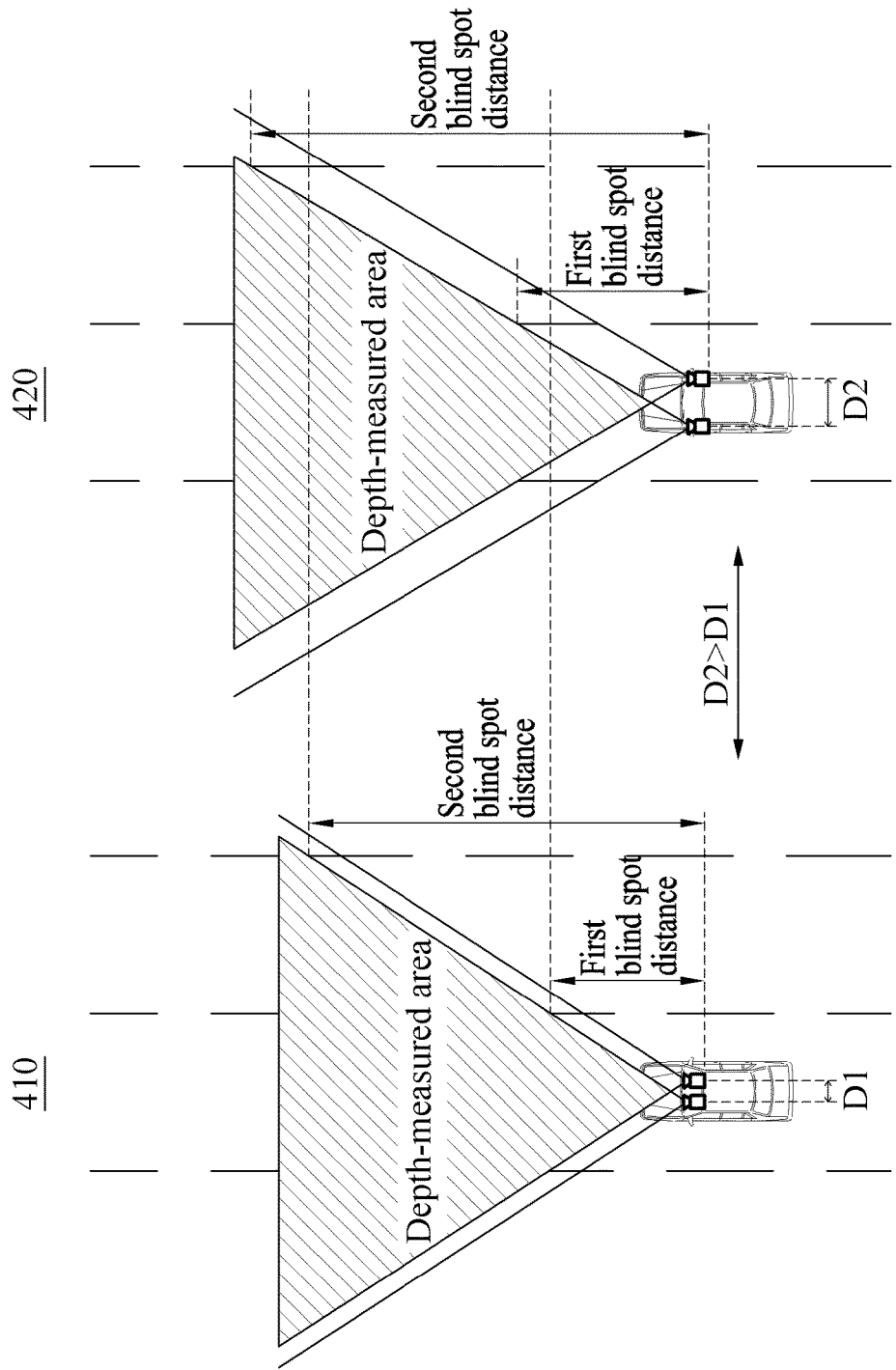
FIG. 4 illustrates examples of blind spot distances and depth measurement areas based on different widths of a stereo camera.

FIG. 4 illustrates examples of blind spot distances and depth measurement areas based on different widths of a stereo camera for an object recognition device, such as any or any combination of the controllers of FIGS. 1-3 and 9. FIG. 4 illustrates a depth-measured area and blind spot distances in a case 410 in which a stereo camera width is D1 and a depth-measured area and blind spot distances in a case 420 in which a stereo camera width is D2, D2 being greater than D1. The depth-measured areas refer to respective measurement areas for which depths are measured or available for measurement. Thus, as illustrated in FIG. 4, a maximum measurable depth and the blind spot distances in the case 410 are less than a maximum measurable depth and the corresponding blind spot distances in the case 420. Thus, in the case 410, while the object recognition device may obtain a visual field that is wider than that of the case 420, an object at a relatively long distance may only be recognized in the case 420 because of the greater maximum measurable depth in the case 420.

As discussed in the foregoing explanation, the width of the stereo camera affects the blind spot areas. Because the blind spot areas are outside of the depth measurement area, depth measurement by the stereo camera may be impossible in the blind spot areas. As demonstrated in FIG. 4, with an increase in the width of the stereo camera from D1 to D2, the maximum measurable depth between case 410 and case 420 also increases. In addition, as the width of the stereo camera increases, the depth error of the respective maximum measurable depths decreases. Thus, when the driving situation is estimated to be that the vehicle is driving at high speed, a visual field securing a longer distance measurement may be desirable or prioritized, e.g., over a wider visual field, so the width of stereo camera may be increased to be greater than or equal to a predetermined level that is set for that driving situation.

To demonstrate the increase of the blind spot area that occurs with the increase in the width of the stereo camera, the blind spot area will be discussed with respect to FIG. 4 using the illustrated blind spot distances. Each illustrated blind spot distance indicates a respective distance between the corresponding depth-measured area and a reference line. In this example, the reference line is set to be a line that extends from a front side of a capturer, a camera lens, an image sensor, or a front side of the vehicle, as only example, across one or more adjacent lanes, such as in a direction perpendicular to an axis of at least one of the cameras of the stereo camera. With respect to FIG. 4, the blind spot distances of the respective most adjacent lanes in case 410 and case 420 will be referred to as the first blind spot distances, and the blind spot distances of the respective subsequently adjacent lanes will be referred to as the second blind spot distances. For brevity of description, the following explanation will be provided based on the first blind spot distance and the description of the first blind spot distance is also applicable to the second blind spot distance. The probability of recognizing a distance of an object located in an adjacent lane decreases as the blind spot distance increases, e.g., due to a narrowing of the field of view. Accordingly, in preparation for changing lanes, changing direction, or a sudden obtrusion of another vehicle or an obstacle, the width of the stereo camera may be decreased to be equal to or less than a predetermined level set for the driving situation of the vehicle driving at low speed, for example, where the recognition of the object in the adjacent lanes may be more desirable. Thus, in the examples of FIG. 4, in the case 410 the stereo camera width D1 may be more suitable for driving situation of the vehicle driving at low speed, such as driving on a general roadway, and in the case 420 the stereo camera width D2 may be more suitable for the driving situation of the vehicle driving at high speed, such as driving on a highway.

Figure 5:
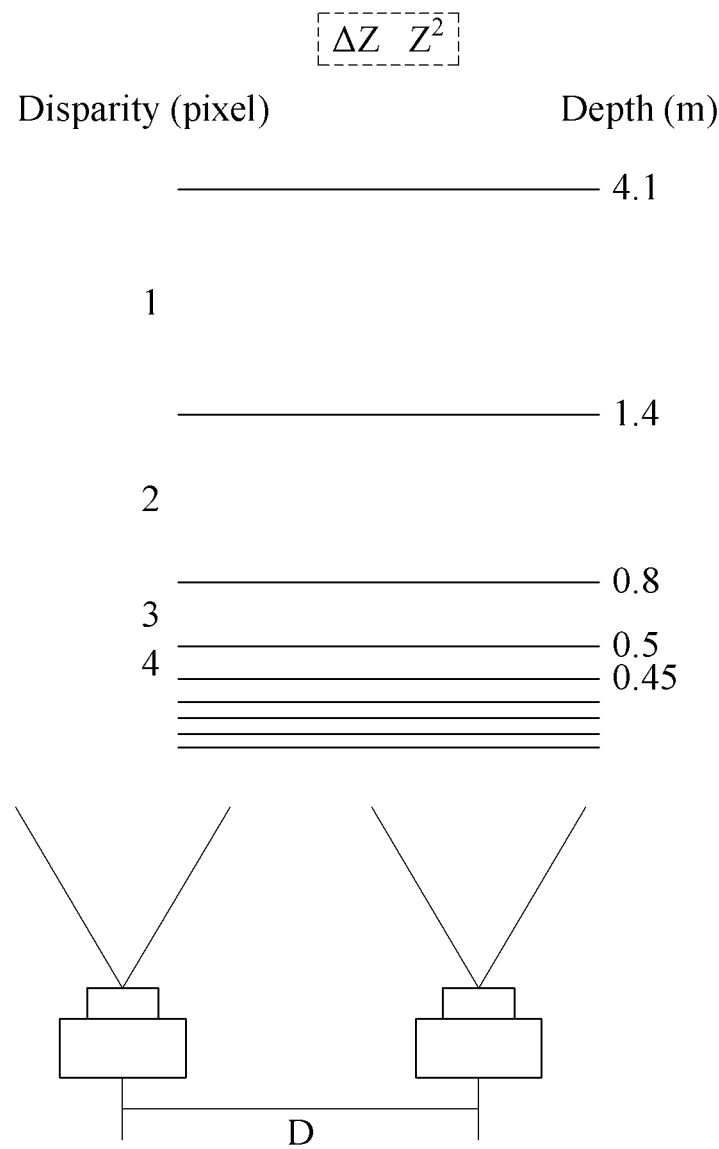
FIG. 5 illustrates an example for depth errors of disparity measurements performed in units of pixel.

FIG. 5 illustrates an example for depth errors of disparity measurements performed in units of pixel. As illustrated in FIG. 5, a pixel-based disparity decreases as the depth between an object and a stereo camera increases. Here, it is noted that as the pixel-based disparity decreases, the depth error increases. The depth error may be a value indicating an error range of a depth of an object predicted using the pixel-based disparity measured as a result of a stereo matching operation performed by a controller, such as any of the controllers of FIGS. 1-3 and 9. The stereo matching may be performed between the respective captured images of the two cameras of the stereo camera, e.g., to match the same object in the separate captured images. As only an example, the pixel-based disparity can be the measurement, e.g., by the controller, of the number of pixels separating the object in the captured images.

For example, it may be assumed that, for the stereo camera of FIG. 5, a focal length f is 3.3 millimeters (mm), a width D of the stereo camera is 25 mm, and a pixel size δ is 40 micrometers (μm). In this example, as illustrated in FIG. 5, the disparity for an object at a depth between 0.45 meters (m) and 0.5 m would be 4, the disparity for an object at a depth between 0.5 m and 0.8 m would be 3, the disparity for an object at a depth between 0.8 m and 1.4 m would be 2, the disparity for an object at a depth between 1.4 m and 4.1 m would be 1. Also, in this example, the depth error is ±0.025 m when the disparity is 4, the depth error is ±0.15 m when the disparity is 3, the depth error is ±0.3 m when the disparity is 2, and the depth error is ±1.35 m when the disparity is 1.

The depth of an object may be obtained according to the below Equation 1, for example.

$$Z = \frac{fD}{d} \quad \text{Equation 1}$$

In Equation 1, Z denotes a depth, f denotes a focal length of the stereo camera, D denotes a width of the stereo camera, and d corresponds to the disparity. In addition, the below example Equation 2 may be obtained by performing partial differentiation on both sides of Equation 1.

$$\partial Z = \frac{D}{d}\partial f + \frac{f}{D}\partial D - \frac{fD}{d^2}\partial d \quad \text{Equation 2}$$

In Equation 2, when it is assumed that f and D are fixed characteristics, Equation 2 may be represented as the below Equation 3, for example.

$$\partial Z \approx \frac{fD}{d^2}\partial d = \frac{Z^2}{fD}\partial d \quad \text{Equation 3}$$

Thus, in Equation 3, the depth error $\partial Z$ is shown to be proportional to a square of depth $Z^2$. Here, it is also noted that this proportionality between $\partial Z$ and $Z^2$ may be different from the proportionality between any lateral error ($\Delta X$) in the observed location of an object with the stereo camera and the depth Z, where $\Delta X$ may be proportional to Z. For example, with the example configuration of FIG. 5, where the focal length δ is 3.3 millimeters (mm), the width D of the stereo camera is 25 mm, and the pixel size δ is 40 micrometers (μm), $\Delta X$ may be 0.7 cm when Z is 0.5 m, $\Delta X$ may be 1.7 cm when Z is 1.4 m, and $\Delta X$ may be 5 cm when Z is 5 m.

As discussed in the foregoing explanation, with an increase in the width of the stereo camera, a field of view may narrow which may result in increased blind spot area, the maximum measurable depth increases, and a depth error of the maximum measurable depth decreases. Conversely, with a decrease in the width of the stereo camera, the field of view may widen which may result in decreased blind spot area, the maximum measurable depth decreases, and the depth error of the maximum measurable depth increases. Here, the reference to a maximum measurable depth refers to a measurable depth for the stereo camera without unsatisfactory error and/or not outside the capabilities of the cameras of the stereo cameras, such as based on the pixel resolution of the captured images of the cameras and/or maximum distance for which measurable disparity can exist or be detected. For example, FIG. 4 demonstrates different depth measured areas for cases 410 and 420, which also respectively illustrate different example maximum measurable depths, and FIG. 5 illustrates an example where at a depth of 4.1 m there may be at most a 1 pixel disparity between pixels in the respective captured images by the cameras of the stereo camera. From Equation 3, the below example Equation 4 may be derived for a depth error $\Delta Z$ for a maximum measurable depth.

$$\Delta Z \approx \frac{Z^2}{fD}\delta \quad \text{Equation 4}$$

In Equation 4, Z denotes the maximum measurable depth of the stereo camera, f denotes the focal length of the stereo camera, D denotes the width of the stereo camera, δ denotes a size of a pixel, and $\Delta Z$ denotes the depth error of the measurable depth. Also, in Equation 4, it can be seen that $\Delta Z$ is proportional to $Z^2$ and δ, and inversely proportional to f and D. Thus, $\Delta Z$ decreases in accordance with a decrease in D, just as $\Delta Z$ increases in accordance with an increase in D. Here, Equation 4 may also be representative of the relationship between the depth error and other depths in addition to the example maximum measurable depth.

With automobile navigation, in one or more embodiments $\Delta Z$ of a measured depth may be of interest when determining a minimum safe separation between traveling vehicles, e.g., a safe distance, which an autonomous vehicle according to one or more embodiments may determine based on a determined driving speed and measured distance to the immediately forward vehicle, e.g., when both vehicles are driving in the forward direction. In such a driving situation, the stopping distance of the following vehicle, at different speeds, may be known or calculated, such as based on experimental results or modeling. As noted below, the stopping distance may include the distance, e.g., braking distance, it physically takes to stop the vehicle from the point when a mechanical stopping operation is initiated and the distance, e.g., reaction distance, traveled during the reaction time it takes the vehicle controller or a user to determine that such stopping is to be performed and initiate the mechanical stopping operation. Here, the vehicle controller may be any of the vehicle controllers of FIGS. 1-3 and 9, as only examples. Accordingly, it may be desirable that the real distance for the stereo camera be at least the stopping distance.

Thus, in consideration of $\Delta Z$, $Z-\Delta Z$ may represent such a safe distance enabling a depth of a target object to be measured without an occurrence of an error to avoid an accident because of the real distance between the target object and the vehicle being closer to the vehicle than the measured $Z$ by the full possible extent of the $\Delta Z$ error. It should also be considered that a depth of an object located farther than the safe distance may not be accurately measured, such as when $Z$ represents the maximum measurable depth and the object is outside of the depth measurement area for a set width of the stereo camera. Conversely, when the stopping distance required to stop the vehicle is greater than the maximum measurable distance—the corresponding $\Delta Z$, i.e., the safe distance, an accident may occur. Thus, the width D may be selectively adjusted such that the safe distance is greater than or equal to the stopping distance.

Figure 6A:
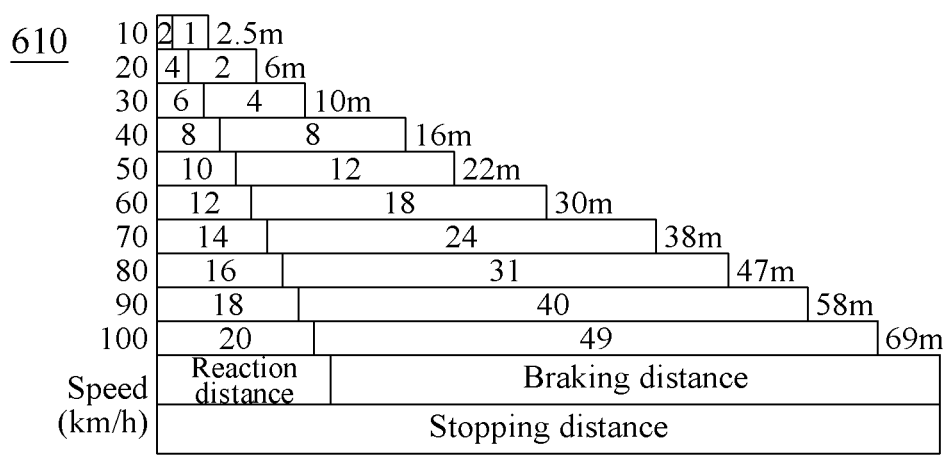
FIGS. 6A and 6B illustrate examples of stopping distances in different driving conditions.
Figure 6B:
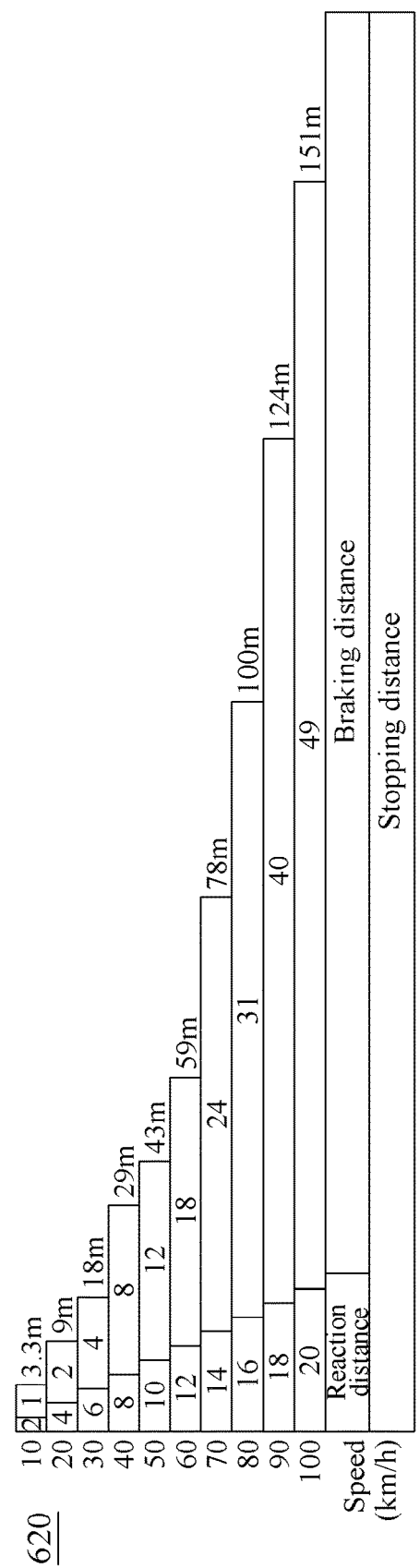

FIGS. 6A and 6B illustrate examples of stopping distances in different driving conditions. Referring to FIGS. 6A and 6B, the stopping distances include the respective braking distances and reaction distances. The reaction distances represent the distances that the vehicle moves until a decelerating manipulation is input, such as by the controller of the autonomous vehicle or by the user, after an obstacle is detected, for example, such as by the user or the controller of the autonomous vehicle. The braking distance indicates a distance that the vehicle moves from the time at which the decelerating manipulation is input until the vehicle stops. The graph 610 of FIG. 6A and the graph 620 of FIG. 6B show respective stopping distances corresponding to different road conditions. For example, stopping distances on a dry paved road are represented in the graph 610 and stopping distances on a frozen road are represented in the graph 620. A controller determines a stopping distance of the vehicle based on a driving situation including a road condition, and determines a parameter associated with a width of a stereo camera based on the stopping distance. Also, the reaction distance may be changed based on a reaction speed of the controller or a user. For example, with users, the controller may calculate the reaction distances for individual users, and determine the appropriate parameter associated with the width of the stereo camera based on the appropriate reaction distance. When the user implements the decelerating manipulation, the autonomous vehicle may be monitoring and performing recognition operations for the surroundings of the vehicle for providing alerts, such as collision or obtrusion alerts, to the user or for other information provisions, such as on a display, instrument cluster, or heads up display of the vehicle. The user may initiate the decelerating manipulation based on such alerts, such as when the autonomous vehicle detects an obtrusion before visually observed by the user.

Figure 7:
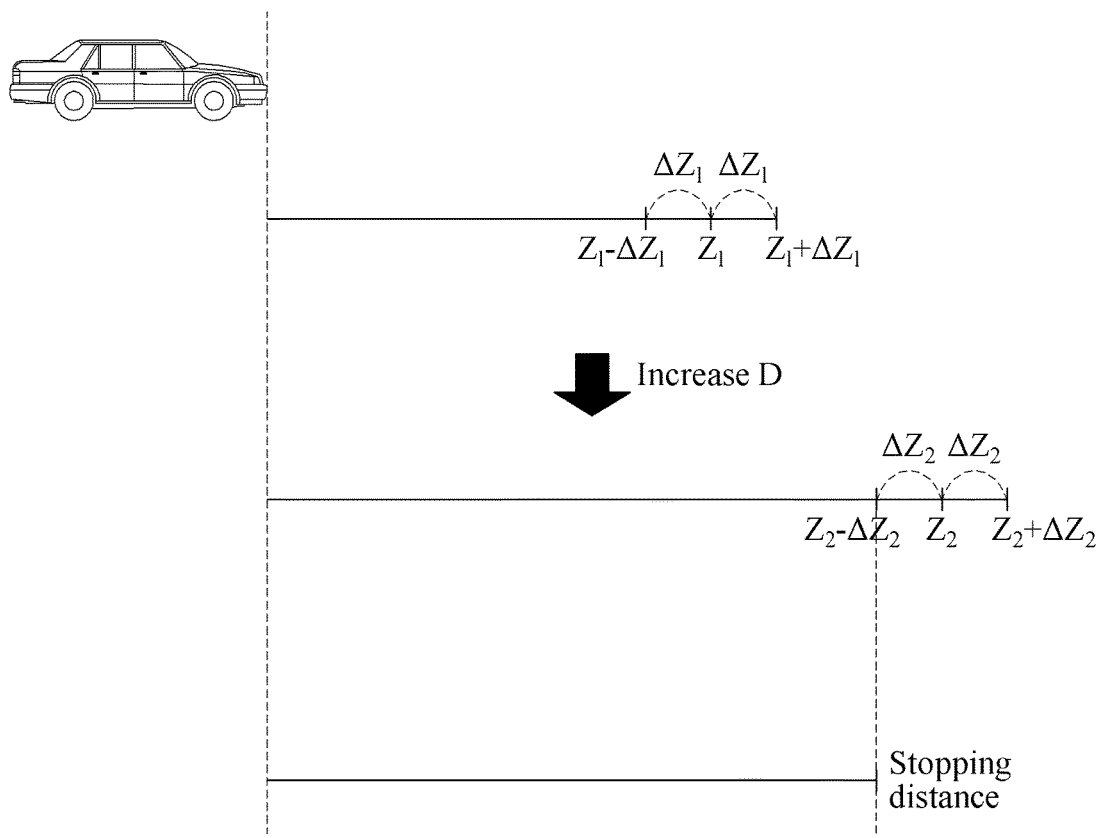
FIG. 7 illustrates an example of a controlling of a width of a stereo camera based on a stopping distance.

FIG. 7 illustrates an example of a controlling of a width of a stereo camera based on a stopping distance. FIG. 7 illustrates a maximum measurable depth $Z_1$, a depth error $\Delta Z_1$ of the maximum measurable depth $Z_1$, a maximum measurable depth $Z_2$, a depth error $\Delta Z_2$ of the maximum measurable depth $Z_2$, and a stopping distance. In the example of FIG. 7, a stereo camera width $D_1$ is less than a stereo camera width $D_2$, the maximum measurable depth $Z_1$ corresponds to the stereo camera width $D_1$, the maximum measurable depth $Z_2$ corresponds to the stereo camera width $D_2$. As described with reference to FIGS. 6A and 6B, the stopping distance is determined based on the driving situation including a driving speed of the vehicle, the road condition, and reaction speed of a user, for example. Also, it may be desirable for the safe distance to be greater than or equal to the stopping distance. Such a constraint associated with the safe distance may be represented by the below Equation 5, for example.

$$Z-\Delta Z \geq SD \qquad \text{Equation 5}$$

In Equation 5, $Z-\Delta Z$ indicates the safe distance and SD denotes the stopping distance. A controller, such as any of the controllers of FIGS. 1-3 and 9, may determine a minimum value of a parameter associated with a width of a stereo camera according to Equation 5, i.e., a minimum value of the parameter for the stereo camera that results in the stereo camera width that provides a maximum measurable $Z$ such that $Z-\Delta Z$ is greater than or equal to the stopping distance. The controller may determine the parameter to have a value greater than or equal to the minimum value. As further discussed below, the controller may also determine a maximum value for the parameter based on another constraint that is associated with a threshold blind spot distance and set the parameter for the stereo camera to have a value between the minimum value and the maximum value.

Referring to the example of FIG. 7, the autonomous driving apparatus has the maximum measurable depth $Z_1$, with the corresponding depth error $\Delta Z_1$, based on the stereo camera width $D_1$. In this example, the safe distance $Z_1-\Delta Z_1$ is demonstrated as being less than the illustrated stopping distance, which may result a greater probability of an accident. Thus, the autonomous driving apparatus may increase the width of the stereo camera to secure a greater safe distance. For example, when the autonomous vehicle increases the stereo camera width from $D_1$ to $D_2$, the autonomous driving apparatus obtains a minimum safe distance $Z_2-\Delta Z_2$, which is greater than or equal to the stopping distance.

In addition, in one or more embodiments, when the driving situation is estimated to be the vehicle driving at a highest speed range, of plural defined speed ranges, for example, to secure a greatest measurable depth the minimum value for the parameter may correspond to the width of the stereo camera being automatically set to the greatest width available, such as by any of the capturers of FIGS. 1-3 and 9, e.g., thereby prioritizing greater maximum measurable depth and lesser maximum depth error over the corresponding increase in extents of the blind spot areas. Conversely, in one or more embodiments, when the driving situation is the vehicle driving at a low or lowest speed range, of such plural defined speed ranges, to secure a wide viewing area the maximum value for the parameter may correspond to the width of the stereo camera being automatically set to the minimum width available, such as by any of the capturers of FIGS. 1-3 and 9, e.g., thereby prioritizing a minimizing of the extents of the blind spot areas over the corresponding decrease in maximum measurable depth and increased maximum depth error.

Figure 8:
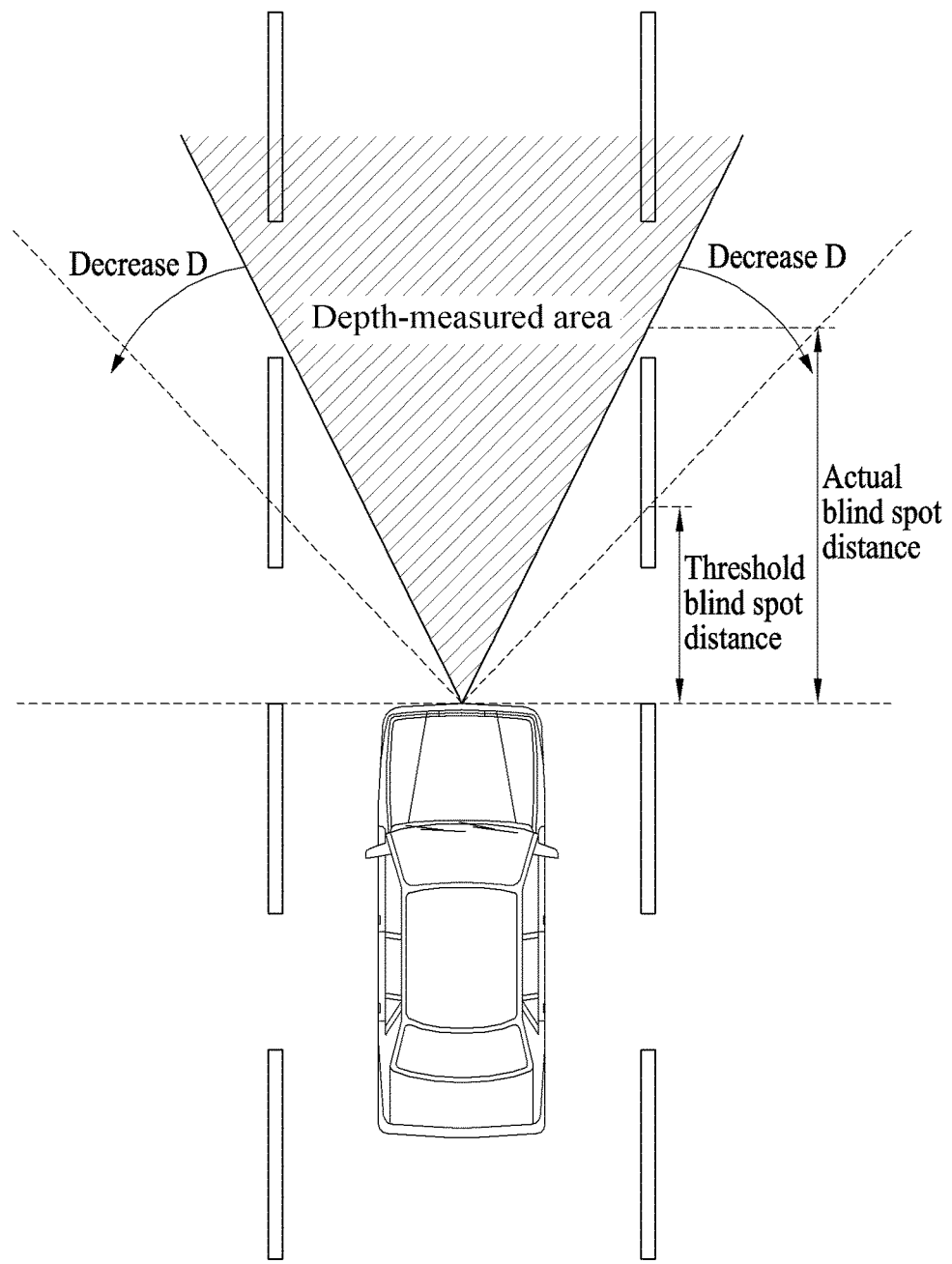
FIG. 8 illustrates an example of a controlling of a width of a stereo camera based on a threshold blind spot distance.

FIG. 8 illustrates an example of a controlling a width of a stereo camera based on a threshold blind spot distance. FIG. 8 illustrates a depth-measured area and a blind spot distance. As discussed in the foregoing explanation, the blind spot distance increases according to an increase in a width of a stereo camera. Since the blind spot distance exerts influence on recognizing a situation of an adjacent lane, an appropriate blind spot distance may desirably be secured based on a driving situation of a vehicle. A controller determines a threshold blind spot distance based on the driving situation of the vehicle. The threshold blind spot distance indicates an example minimum distance for, or maximum extent of, a blind spot area for measuring a distance between the vehicle and an object located on an adjacent lane based on the driving situation.

For example, when driving at high speed, the probabilities of changing lanes, changing direction, or sudden obtrusions of another vehicle may be relatively low. Thus, the controller may set a relatively long threshold blind spot distance for the driving situation when the vehicle is driving at high speed when compared to the driving situation when the vehicle is driving at low speed. Also, since a wide visual field may be desirably secured in the driving situation when the vehicle is driving at low speed, driving in a city, and a driving in cloudy weather, the controller may decrease the threshold blind spot distance compared to the relatively long threshold blind spot distance for the driving situation when the vehicle is driving at high speed. To obtain an appropriate visual field corresponding to the driving situation, it may be desirable for an actual blind spot distance to be less than the threshold blind spot distance set for that driving situation. Such a constraint associated with the threshold blind spot distance may be expressed by the below Equation 6, for example.

$$BD_{TH} \geq BD_A \quad \text{Equation 6}$$

In Equation 6, $BD_{TH}$ denotes the threshold blind spot distance, and $BD_A$ denotes the actual blind spot distance. Thus, in one or more embodiments, the controller may determine a maximum value of a parameter associated with the width of the stereo camera using Equation 6. In such an example, the controller determines the parameter associated with the width of the stereo camera such that the parameter has a value less than or equal to the determined maximum value. As noted above, the controller may also determine a minimum value of the parameter associated with the width of the stereo camera based on a different constraint associated with the aforementioned safe distance, and, thus, determine or set the parameter associated with the width of the stereo camera to be a final value, for example, between the maximum value and the minimum value.

In the example of FIG. 8, the actual or current blind spot distance is illustrated as being greater than the illustrated threshold blind spot distance. For example, the controller may have decreased the threshold blind spot distance from a previous greater threshold blind spot distance in response to a determined change in lane or direction, sensed other vehicle movement or obtrusion, or a change in a weather condition. In this example, the illustrated threshold blind spot distance may, thus, have been decreased to be less than the actual or current blind spot distance. Accordingly, the controller may decrease the width of the stereo camera to adjust the actual blind spot distance so as to be less than or equal to the illustrated threshold blind spot distance. Through such an adjustment of the width of the stereo camera, an autonomous driving apparatus obtains an appropriate visual field corresponding to a current determined driving situation.

Figure 9:
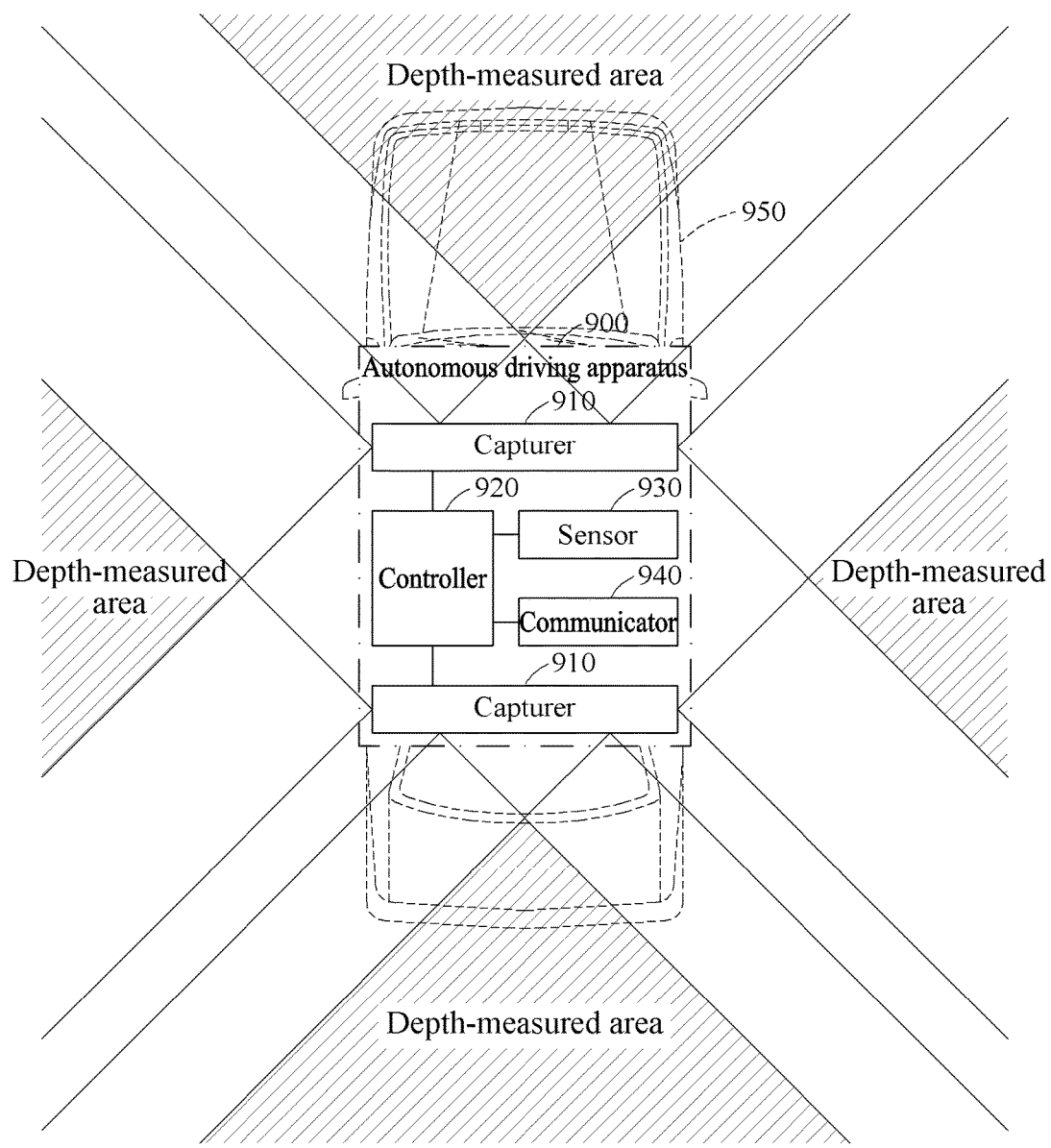
FIG. 9 illustrates an example of an autonomous driving apparatus.

FIG. 9 illustrates an example of an autonomous driving apparatus. Referring to FIG. 9, an autonomous driving vehicle 950 is or includes an autonomous driving apparatus 900, such as any of the autonomous driving apparatuses of FIGS. 1-3. Here, it is also noted that the autonomous driving apparatus 900 may be, or may be included in, an automobile or truck, as well as a motorcycle, 3 wheel vehicle, or a drone that can fly or operate underwater. The autonomous driving apparatus 900 includes multiple capturers 910, a controller 920, one or more sensors 930, and one or more communicators 940. In an example, the controller 920 is representative of one or more processors or a vehicle control module, as only an example, including such one or more processors configured to perform any one or more or all of the operations described herein. In another example, the controller 920 may be representative of such one or more processors and one or more memories configured to store instructions to control the one or more processors to execute such instructions to implement such operations and/or store or cache received sensor or external sensor or device information or corresponding estimated driving situation determinations. The memory may alternatively or additionally be configured elsewhere within the autonomous driving apparatus, noting that depending on embodiment the autonomous driving apparatus may be the vehicle, a system less than the vehicle, or merely one or more such controller(s) 920. Briefly, though an example of the controller 920 operating through such one or more processors has been described, embodiments also include the controller performing one or more or all of such operations through hardware other than such processors. The capturers 910 may respectively include cameras to perform capturing in at least one of a front direction, a rear direction, or a side direction. For example, the illustrated example two capturers 910 of FIG. 9 use respective cameras to perform capturing in the front direction and the rear direction, or capturing in the front direction, the rear direction, and/or one or more side directions, e.g., according to the aforementioned discussions regarding FIGS. 2 and/or 3, as only examples. The capturers 910 may be disposed at various positions for example, on a periphery of a loop panel of the autonomous driving vehicle 950, noting that alternative arrangements are also available. The foregoing descriptions regarding FIGS. 1-8 are also applicable to the capturers 910, though embodiments are not limited thereto. The sensor 930 generates situation information for estimating a driving situation of the autonomous driving vehicle 950 and may transmit the situation information to the controller 920. The communicator 940 may receive situation information from a device external to the autonomous driving vehicle 950 and transmit the received situation information to the controller 920.

The controller 920 estimates the driving situation of the autonomous driving vehicle 950 and determines a parameter associated with a width for a stereo camera based on the driving situation. The controller 920 controls at least one of the capturers 910 such that two cameras included in the corresponding capturer(s) 910 have a distance therebetween corresponding to the determined parameter. When performing capturing in at least two directions, the controller 920 may control different camera pairs on the same capturer 910 or different cameras on different capturers 910 based on different parameters or the same parameter. For example, one of the capturers 910 performs the capturing in the front direction and the rear direction, e.g., using respective stereo cameras, or a stereo camera of one of the capturers 910 performs the capturing in the front direction and a stereo camera of another of the capturers 910 performs capturing in the rear direction. The controller 920 may determine a parameter P associated with a width of the corresponding stereo camera based on an estimated driving situation, and control the respective capturers 910 such that the corresponding two cameras of the stereo camera performing the capturing in the front direction have a distance therebetween corresponding to the parameter P and the corresponding two cameras of the stereo camera performing the capturing in the rear directions have a distance therebetween corresponding to the parameter P. Here, though the same parameter P is shown as being applied to forward and rearward image capturing, respective different parameters may be determined as discussed above for each stereo camera based on respective preset driving situation dependent maximum measurement distances and/or threshold blind spot distances, as only examples. In the example where the same parameter P is used for the front and rear image capturing, a visual field of at least a maximum measurable depth, a safe distance, and a threshold blind spot distance may be secured in the rear direction, for example.

FIG. 10 illustrates an example of an autonomous driving method. Referring to FIG. 10, in operation 1010, an autonomous driving apparatus, for example, acquires and/or estimates a driving situation of a vehicle. In operation 1020, the autonomous driving apparatus determines a parameter associated with a width of a stereo camera based on the estimated driving situation. In operation 1030, the autonomous driving apparatus controls a capturer performing capturing in a first direction such that two cameras included in the capturer are controlled to be separated by a distance corresponding to the parameter. In operation 1040, the autonomous driving apparatus measures a depth of an object located in the first direction based on output images of the two cameras. Since any or all of the foregoing descriptions are also applicable here, further repeated descriptions about the autonomous driving method will be omitted.

The capturer 110, controller 120, capturer 210, cameras 215, controller 220, capturer 310, cameras 315, controller 320, capturer 910, controller 920, sensor(s) 920, and communicator(s) 940, for example, in FIGS. 1-5 and 9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, optical sensors, and any other electronic components configured to perform the operations described in this application. In other examples, one or more of the hardware components, such as any of the controllers, sensors, and communicators, that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

In one or more embodiments, the methods and processes illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application t that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An autonomous driving method comprising:
estimating a driving situation of a vehicle based on at least a driving speed of the vehicle;
determining a parameter to control a stereo camera width of a stereo camera based on the driving situation;
controlling a capturer, comprising two cameras of the stereo camera, configured to control an arrangement between the two cameras for a first direction based on the parameter; and
measuring a depth of an object located in the first direction based on two images respectively captured by the two cameras with the controlled arrangement,
wherein the controlling of the capturer further comprises:
detecting a vehicle or an obstacle in the first direction based on the estimated driving situation;
assigning a priority to the two cameras located in the first direction;
selecting the two cameras that are separated apart from each other by a distance corresponding to the parameter based on the assigned priority; and
operating a remaining cameras other than the selected two cameras in a standby or power off mode.

2. The method of claim 1, wherein the two cameras are selected from among a plurality of cameras facing the first direction in a camera array of the capturer.

3. The method of claim 2, wherein the plurality of cameras are fixedly arranged in the capturer and each is linearly separated by a first distance, and the distance corresponding to the parameter is evenly divisible by the first distance.

4. The method of claim 1, wherein the two cameras are configured in the capturer to be selectively moved by the capturer, and
the controlling of the capturer comprises selectively moving at least one of the two cameras such that the two cameras are separated apart from each other by a distance corresponding to the parameter.

5. The method of claim 4, wherein the two cameras are configured in the capturer to be selectively moved by the capturer along a route, and
the controlling of the capturer comprises selectively moving the at least one of the two cameras along the route such that the two cameras are separated apart from each other by the distance corresponding to the parameter.

6. The method of claim 1, wherein the determining of the parameter comprises:
determining a stopping distance of the vehicle based on the driving situation; and
determining the parameter based on a constraint associated with the stopping distance.

7. The method of claim 6, wherein the constraint associated with the stopping distance is based on a maximum measurable depth corresponding to the stereo camera width and a relationship between the stopping distance and a safe distance based on a depth error of the maximum measurable depth.

8. The method of claim 1, wherein the determining of the parameter comprises:
determining a threshold for a blind spot area based on the driving situation; and
determining the parameter based on a constraint associated with the threshold for the blind spot area.

9. The method of claim 8, wherein the determining of the threshold for the blind spot area comprises determining a threshold blind spot distance based on the driving situation, and the constraint is associated with the threshold blind spot distance.

10. The method of claim 9, wherein the constraint associated with the threshold blind spot distance is based on a relationship between the threshold blind spot distance and a blind spot distance corresponding to the stereo camera width.

11. The method of claim 1, wherein the determining of the parameter comprises:
determining a stopping distance and a threshold for a blind spot area based on the driving situation;
determining a minimum value for the parameter based on a first constraint associated with the stopping distance;
determining a maximum value for the parameter based on a second constraint associated with the threshold for the blind spot area; and
determining the parameter to be a value equal to either or between the minimum value and the maximum value.

12. The method of claim 11, wherein the determining of the threshold comprises determining a threshold blind spot distance, and the second constraint is associated with the threshold blind spot distance.

13. The method of claim 1, wherein the determining of the parameter comprise determining the parameter such that a depth error of a maximum measurable depth corresponding to the stereo camera width is reduced over a depth error of another maximum measurable depth corresponding to another stereo camera width determined for a different driving situation corresponding to the vehicle driving at a lower speed, in response the driving situation being the vehicle driving at high speed.

14. The method of claim 1, wherein the determining of the parameter comprises determining the parameter such that a blind spot distance corresponding to the stereo camera width is reduced over a blind spot distance corresponding to another stereo camera width determined for a different driving situation corresponding to the vehicle driving at a higher speed, in response to the driving situation being the vehicle driving at low speed.

15. The method of claim 1, wherein the driving situation is determined based on the driving speed and at least one of a moving direction of the vehicle, a location of the vehicle, or a user manipulation.

16. The method of claim 1, wherein the driving situation comprises at least one of the vehicle driving straight ahead, changing lanes, changing direction, driving on a highway, driving at high speed, driving at low speed, driving in a city, driving with a weather affecting condition, or driving with a road affecting condition, and
the determining of the parameter comprises determining the parameter based on the driving situation and corresponding prioritized consideration between an extent of depth error of a maximum measurable depth corresponding to the stereo camera width and an extent of a blind spot area corresponding to the stereo camera width.

17. The method of claim 1, further comprising:
predicting a driving direction of the vehicle based on the driving situation,
wherein the determining of the parameter comprises determining the parameter based on a visual field direction of the stereo camera corresponding to the predicted driving direction.

18. The method of claim 17, further comprising selectively turning off one or more additional stereo cameras of the vehicle for one or more other visual field directions that are not needed for driving of the vehicle in the predicted driving direction.

19. The method of claim 1, further comprising:
controlling the capturer or another capturer so that two additional cameras perform stereo capturing in a second direction, opposite to the first direction, with a stereo camera width based on the parameter; and
measuring a depth of an object located in the second direction based on output images of the two additional cameras,
wherein the capturer or the other capturer is configured to perform capturing in the second direction in coordination with the captured two images in the first direction.

20. A non-transitory computer-readable storage medium storing instructions that, when executed by a processor, cause the processor to perform the method of claim 1.

21. An autonomous driving apparatus comprising:
a capturer comprising at least two cameras, the capturer being configured to control arrangement between the at least two cameras; and
a controller configured to:
determine a parameter related to a stereo camera width, of a stereo camera represented by the at least two cameras, based on an estimated driving situation of a vehicle, to control the capturer to control the arrangement between the at least two cameras based on the determined parameter, and to measure a depth of an object located in a first direction based on two images respectively captured by the at least two cameras with the controlled arrangement,
wherein the estimated driving situation is determined based on at least a driving speed of the vehicle, and
wherein the controller is further configured to:
detect a vehicle or an obstacle in the first direction based on the estimated driving situation;
assign a priority to the two cameras located in the first direction;
select the at least two cameras that are separated apart from each other by a distance corresponding to the parameter based on the assigned priority; and
operate a remaining cameras other than the selected two cameras in a standby or power off mode.

22. The apparatus of claim 21, wherein the controller is further configured to determine the estimated driving situation based on sensed information or one or more driving situation estimations from sensors of the vehicle and/or from sensors or devices external of the vehicle.

23. The apparatus of claim 21, wherein the capturer comprises a camera array including a plurality of cameras facing in the first direction, and
the controller is configured to select, from among the plurality of cameras, the at least two cameras.

24. The apparatus of claim 23, wherein the plurality of cameras are fixedly arranged in the capturer and each linearly separated by a first distance, and the distance corresponding to the determined parameter is evenly divisible by the first distance.

25. The apparatus of claim 21, wherein the at least two cameras are configured in the capturer to be selectively moved by the capturer, and
the controller is configured to control the capturer to move one or more of the at least two cameras such that the at least two cameras are separated from each other by a distance corresponding to the determined parameter.

26. The apparatus of claim 25, wherein the at least two cameras are configured in the capturer to be selectively moved by the capturer along a predetermined route, and
the controller is configured to control the capturer to move the one or more of the at least two cameras along the predetermined route such that the at least two cameras are separated from each other by the distance corresponding to the determined parameter.

27. The apparatus of claim 21, wherein the controller is configured to determine a stopping distance of the vehicle based on the estimated driving situation and determine the parameter based on a predetermined constraint associated with the stopping distance.

28. The apparatus of claim 27, wherein the predetermined constraint associated with the stopping distance is based on consideration of a maximum measurable depth corresponding to the stereo camera width and a relationship between the stopping distance and a safe distance based on a depth error of the maximum measurable depth.

29. The apparatus of claim 21, wherein the controller is configured to determine a threshold for a blind spot area based on the estimated driving situation and determine the parameter based on a predetermined constraint associated with the threshold for the blind spot area.

30. The apparatus of claim 29, wherein the determining of the threshold for the blind spot area comprises determining a threshold blind spot distance based on the estimated driving situation, and the predetermined constraint is associated with the threshold blind spot distance.

31. The apparatus of claim 30, wherein the predetermined constraint associated with the threshold blind spot distance is based on consideration of a relationship between the threshold blind spot distance and a blind spot distance corresponding to the stereo camera width.

32. The apparatus of claim 21, wherein the controller is configured to determine a stopping distance and a threshold for a blind spot area based on the estimated driving situation, determine a minimum value for the parameter based on a predetermined constraint associated with the stopping distance, determine a maximum value for the parameter based on a predetermined constraint associated with the threshold for the blind spot area, and determine the parameter to be a value equal to either or between the minimum value and the maximum value.

33. The apparatus of claim 32, wherein the determining of the threshold comprises determining a threshold blind spot distance, and the predetermined constraint is associated with the threshold blind spot distance.

34. The apparatus of claim 21, wherein, when the estimated driving situation is the vehicle driving at high speed, the controller is configured to determine the parameter such that a depth error of a maximum measurable depth corresponding to the stereo camera width is reduced over a depth error of another maximum measurable depth corresponding to another stereo camera width determined for a different estimated driving situation corresponding to the vehicle driving at a lower speed.

35. The apparatus of claim 21, wherein, when the estimated driving situation is the vehicle driving at low speed, the controller is configured to determine the parameter such that a blind spot distance corresponding to the stereo camera width is reduced over a blind spot distance corresponding to another stereo camera width determined for a different estimated driving situation corresponding to the vehicle driving at a higher speed.

36. The apparatus of claim 21, further comprising: a sensor configured to sense at least one of the driving speed of the vehicle, a moving direction of the vehicle, a location of the vehicle, or a user manipulation, wherein the estimated driving situation is determined based on the driving speed and at least one of the moving direction of the vehicle, the location of the vehicle, or the user manipulation.

37. The apparatus of claim 21, wherein the estimated driving situation comprises at least one of the vehicle driving straight ahead, changing lanes, changing direction, driving on a highway, driving at high speed, driving at low speed, driving in a city, driving with a weather affecting condition, or driving with a road affecting condition, and
the controller is configured to determine the parameter based on the estimated driving situation in prioritized consideration between an extent of depth error of a maximum measurable depth corresponding to the stereo camera width and an extent of a blind spot area corresponding to the stereo camera width.

38. The apparatus of claim 21, wherein the controller is configured to predict a driving direction of the vehicle based on the estimated driving situation and determine the parameter based on a visual field direction of the stereo camera corresponding to the predicted driving direction.

39. The apparatus of claim 38, wherein the controller is configured to selectively turn off one or more additional stereo cameras of the vehicle respectively for one or more other visual field directions that are determined not needed for driving of the vehicle in the predicted driving direction.

40. The apparatus of claim 21, wherein the capturer or another capturer is configured to include two additional cameras to perform stereo capturing in a second direction, opposite the first direction, with a stereo camera width based on the determined parameter, and
the controller is configured to control the capturer or the other capturer in coordination with the captured two images in the first direction so that the two additional cameras perform the capturing in the second direction with the stereo camera width based on the determined parameter, and configured to measure a depth of an object located in the second direction based on output images of the two additional cameras.

41. An autonomous driving apparatus, the apparatus comprising:
a processor configured:
to determine a parameter to control a stereo camera width of a stereo camera based on an estimated driving situation of a vehicle, wherein the estimated driving situation is determined based on at least a driving speed of the vehicle,
to control a capturer configured to control arrangement between two cameras of the stereo camera for a first direction based on the parameter, and
to measure a depth of an object located in the first direction based on two images respectively captured by the two cameras with the controlled arrangement,
wherein the processor is further configured to:
detect a vehicle or an obstacle in the first direction based on the estimated driving situation;
assign a priority to the two cameras located in the first direction;
select the two cameras that are separated apart from each other by a distance corresponding to the parameter based on the assigned priority; and
operate a remaining cameras other than the selected two cameras in a standby or power off mode.

42. The apparatus of claim 41, further comprising a memory configured to store instructions,
wherein the processor is further configured to execute the instructions to configure the processor to perform the determining of the parameter to control the stereo camera width of the stereo camera based on the estimated driving situation.

43. The apparatus of claim 41, wherein the processor is further configured to determine the estimated driving situation based on sensed information or one or more driving situation estimations from sensors of the vehicle and/or from sensors or devices external of the vehicle.

44. The apparatus of claim 43, further comprising the capturer, which comprises the two cameras, and/or the sensors of the vehicle.

45. The apparatus of claim 43, wherein the apparatus comprises the capturer and the capturer comprises a camera array including a plurality of cameras facing in the first direction, and
the processor is further configured to select, from among the plurality of cameras, the two cameras that are separated apart from each other by a distance corresponding to the determined parameter.

46. The apparatus of claim 45, wherein the plurality of cameras are fixedly arranged in the capturer and each linearly separated by a first distance, and the distance corresponding to the determined parameter is evenly divisible by the first distance.

47. The apparatus of claim 43, wherein the apparatus comprises the capturer and the two cameras are configured in the capturer to be selectively moved by the capturer, and
    the processor is further configured to control the capturer to move one or more of the two cameras such that the two cameras are separated from each other by a distance corresponding to the determined parameter.

48. The apparatus of claim 47, wherein the two cameras are configured in the capturer to be selectively moved by the capturer along a predetermined route, and the processor is configured to control the capturer to move the one or more of the two cameras along the predetermined route such that the two cameras are separated from each other by the distance corresponding to the determined parameter.

49. The apparatus of claim 48, wherein, for the selective moving of the two cameras by the capturer, the processor is further configured to control the capturer to rotate at least one of the two cameras in a prioritized direction based on the estimated driving situation.

50. The apparatus of claim 43, wherein the apparatus comprises the capturer and the two cameras are configured in the capturer to be selectively moved by the capturer, and
    the processor is configured to control the capturer to rotate at least one of the two cameras in a prioritized direction corresponding to a direction indicated by a user manipulation of a turn signal level of the vehicle or based on which of left or right turn signal indicators are activated in the vehicle.

51. The apparatus of claim 41, wherein the processor is further configured to determine a stopping distance and a threshold for a blind spot area based on the estimated driving situation, determine a minimum value for the parameter based on a predetermined constraint associated with the stopping distance, determine a maximum value for the parameter based on a predetermined constraint associated with the threshold for the blind spot area, and determine the parameter to be a value equal to either or between the minimum value and the maximum value.

52. The apparatus of claim 51, wherein the determining of the threshold comprises determining a threshold blind spot distance, and the predetermined constraint is associated with the threshold blind spot distance.

53. The apparatus of claim 41, wherein, when the estimated driving situation is the vehicle driving at high speed, the processor is configured to determine the parameter such that a depth error of a maximum measurable depth corresponding to the stereo camera width is reduced over a depth error of another maximum measurable depth corresponding to another stereo camera width determined for a different estimated driving situation corresponding to the vehicle driving at a lower speed.

54. The apparatus of claim 41, wherein, when the estimated driving situation is the vehicle driving at low speed, the processor is configured to determine the parameter such that a blind spot distance corresponding to the stereo camera width is reduced over a blind spot distance corresponding to another stereo camera width determined for a different estimated driving situation corresponding to the vehicle driving at a higher speed.

55. The apparatus of claim 41, wherein the processor is further configured to determine surrounding environment information of the vehicle based on the measured depth and to control the determined surrounding environment information to be displayed on a display of the vehicle.

56. The apparatus of claim 41, wherein the vehicle is an automobile.

* * * * *